United States Patent Office 3,374,143
Patented Mar. 19, 1968

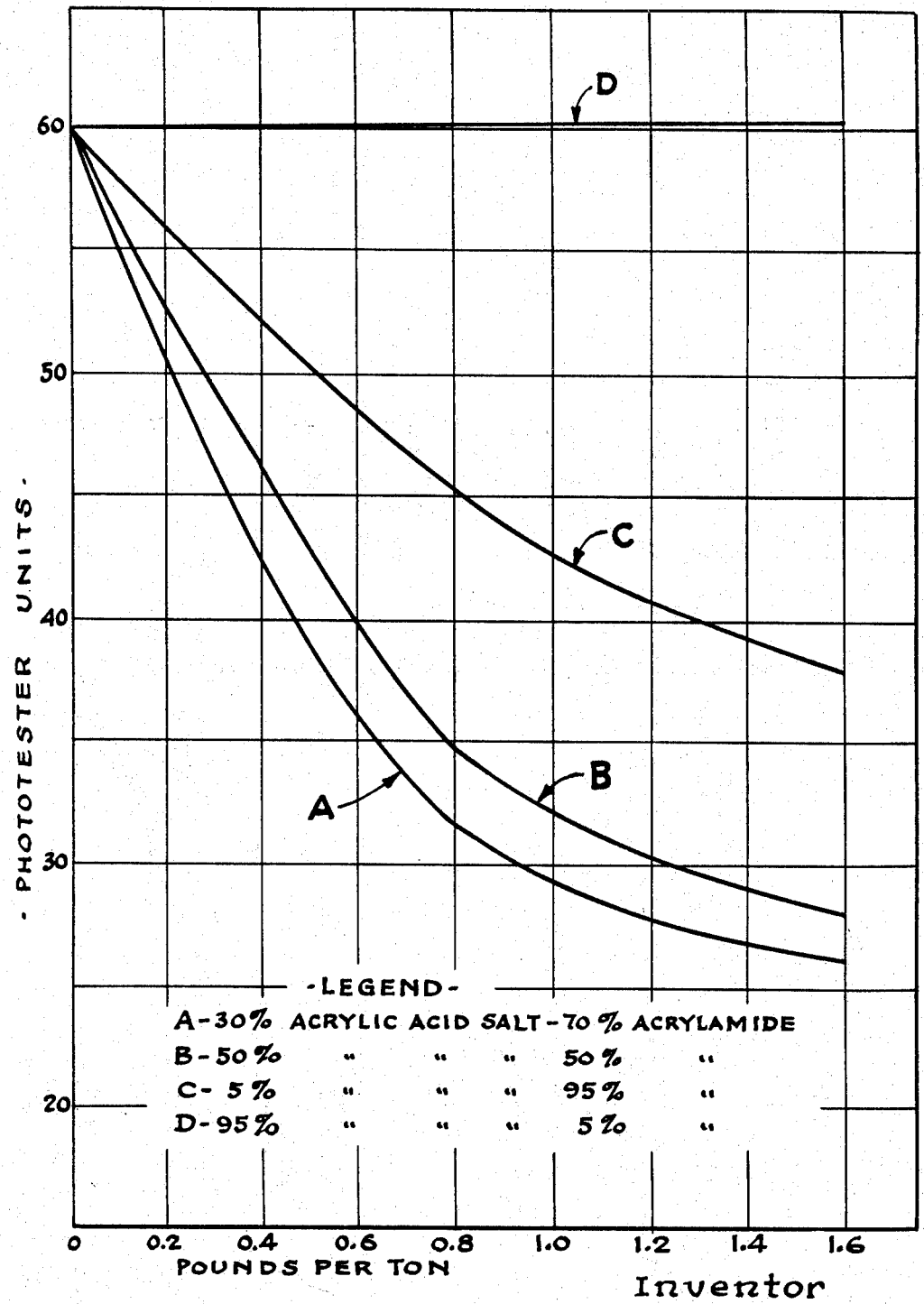

3,374,143
METHOD OF IMPROVING OPERATIONAL EFFICIENCY OF WHITE WATER RECOVERY SYSTEM BY TREATMENT WITH ANIONIC COPOLYMERS OF ACRYLIC ACID SALTS AND ACRYLAMIDE
William M. Stephenson, Park Forest, Ill., assignor to Nalco Chemical Company, Chicago, Ill., a corporation of Delaware
Filed June 11, 1964, Ser. No. 374,453
2 Claims. (Cl. 162—190)

ABSTRACT OF THE DISCLOSURE

This invention is concerned with improving the operational efficiency of vacuum and flotation type white water recovery systems by treating them with specific anionic copolymers of acrylic acid salts and acrylamide.

---

This invention relates to a method for improving the operaional efficiency of white water recovery systems of the type commonly found in the manufacture of fibrous products such as paper. Particularly the invention is directed to an improved method for increasing the operational efficiency of white water flotation type saveall systems through addition of specific water-soluble copolymeric compounds.

Paper manufacturers are continually trying to discover better methods for efficiently handling the processing and disposal of white waters. White waters, for purposes of this invention, are any aqueous suspensions of solid materials which remain after the processing of the greater part of fibrous and non-fibrous materials in the aqueous suspension to form a sheet or mat-like structure. In a standard papermaking operation, a typical furnish contains from 0.1 to 6.0% by weight of pulp as well as other dispersed or suspended ingredients such as, for instance, inorganic fillers and size such as rosin, glue, flour and the like. This aqueous slurry is passed onto a Fourdrinier wire or cylinder wire mold which retains the majority of the suspended fibrous materials and other chemicals, with much of the excess of the water used to suspend the pulp being allowed to drain through the wire where it is collected by various types of apparatus which are commonly referred to in the paper manufacturing trade as saveall systems.

The drainage entering the saveall systems will be composed substantially of water but will contain from 0.005 to 0.2% by weight of various types of organic and inorganic substances which were used in the furnish or makeup of the initial pulp slurry. This water suspension of finely divided solids in the saveall system is known as white water. The finely divided solids contained in the saveall should be collected and returned to the paper processing stream if efficient utilization of the various materials contained therein is to be achieved.

In the past, it has been common to dispose of white waters from the paper manufacturing process by discharging them into streams or sewage systems where they would ultimately find their way into various types of natural bodies of water. As paper production was increased, it was soon discovered that white waters tended to be a contaminating factor. They provided a source of both organic and inorganic pollution to the water, and they tended to increase the B.O.D. (biological oxygen demand) of these natural water bodies to the extent that they became unsuitable for use as sources of potable water. This contamination also tended to destroy the marine life which often flourished in these waters.

With the development of the paper industry, numerous attempts were made to improve white water recovery systems. Great advances have been made in the types and designs of white water recovery systems. As a general rule, there are three basic types of white water recovery systems. First, but perhaps the least efficient, is the settling type system in which the white waters are fed into a reservoir or settling basin where the suspended solids are allowed to gradually sink to the bottom of the basin. After a period of time has elapsed substantial settling occurs. The water is then withdrawn for either re-use or is discharged to appropriate waste disposal systems. The settled material is removed by either scraping or cleaning operations. This system not only requires large expensive equipment units, but is extremely inefficient from the viewpoint of processing time, maintenance, and labor requirements for operation. For the most part, settling type systems have been replaced by newer more efficient systems and are only used to a very limited extent.

The newer type of saveall units may be generally classified as either vacuum type systems or flotation type systems. The vacuum type system operates on a simple principle. In this system a wire rotary drum having a plurality of foramen is employed and the paper stock as it passes over the wire drum is subjected to a vacuum which deposits the fibers on the wire with the water being passed through for re-use or disposal. In this type of system, the suspended solids of the system are collected on the drum wire and are then removed by scraping, dumping, or the like. Usually a breaker roll is used to contact the wire drum whereupon the vacuum is broken and the fibrous mat is transferred to the roll and subsequently re-used or discarded. The major disadvantage of the vacuum type system is that it is only practical where the drainage characteristics of the suspended solids in the white water produce a mat upon the vacuum drum that is relatively non-compact and allows good drainage to occur. For this reason, the vacuum type systems are not particularly suited for use in many types of papermaking operations and are therefore somewhat limited.

In recent years, great strides have been made in flotation type white water processing systems. The principle upon which the flotation saveall systems operate is that of continuously dissolving air under pressure into a collected quantity of white water. This produces a floatable mass consisting of fiber and other undissolved components which separate from the furnish used in the particular paper process. After the air has been dissolved under pressure into the white water, the compressed white water is then released to the atmosphere or to a reduced pressure system, usually by passage into a separate container. As a result, air bubbles are formed which carry the fiber and other suspended materials to the surface of the collecting container. After being carried to the surface of the container, the suspended materials which are frequently in the form of a frothy or foamy mass, are then skimmed by means of suitable mechanical skimmers and are then either returned for reprocessing or are discharged to waste.

While the flotation type saveall systems have proved themselves to be the most efficient from both the standpoint of equipment investment as well as operational efficiency, it has been observed that these systems are not entirely satisfactory. Although careful operational control of these systems will enable a fairly adequate treatment of white water, it has been found necessary to employ various types of chemicals in conjunction with their use. Chemicals not only improve their efficiency but also simplify the operation of these units.

In summary, it might be said that the function and primary purpose of various types of saveall systems is to save additional fiber and other suspended materials contained in the white water. Another important benefit derived from the use of saveall equipment is to improve the clarity of the treated white water by removing suspended solids thereby enabling it to be re-used in various mill operations where a relatively high quality of water is required. Another purpose of efficient saveall operation is to decrease pollution loads to streams and other natural bodies of water. A further important aspect of efficient saveall operation is to decrease the number of man hours needed to operate and maintain equipment. When chemicals are used in conjunction with saveall systems it is beneficial that they be used at a low economical dosage and that they tend to generally upgrade the efficiency of the plant in which they are employed.

The most commonly used chemicals in the treatment of white waters to improve the operational efficiency of saveall units are naturally occurring polymeric proteins such as various types of animal glues. Glue is said to promote the agglomeration of suspended solids in the saveall system and thereby increase the yield of suspended matter that is removed or acted upon by the system. Glue, however, has several drawbacks which makes its use in saveall systems not entirely satisfactory. Animal glues tend to support microbiological growth which forms slime masses in saveall systems and substantially interferes with their operation. In another aspect, glue is not satisfactory since it must be used under rather critical pH conditions for its most efficient employment. Also, glue is not entirely satisfactory since it is difficult to make up treating solutions and they must be used within a relatively short period of time after being made up since age tends to destroy their usefulness. Lastly, for efficient operation, relatively gross amounts of glue must be used.

In addition to using glue, other chemicals have been suggested for improving the efficiency of saveall operations. These chemicals may be illustrated by such materials as activated silica, alum, sodium aluminate, and the like. Quite frequently such factors as pH, dissolved solids, retention time in the system, flow rate and the nature of the suspended solids will act to negate or substantially lessen the effectiveness of these prior art additives.

Another problem that is sometimes encountered in the use of various types of saveall systems and, in particular, flotation type saveall systems, is that while the unit is capable of removing the fibrous matter contained in the white water; it is not effective in collecting various types of fillers, size ingredients, and the like which are intimately admixed with the fibers during the paper manufacturing process.

With the several problems enumerated above, it is evident that improvement is needed in the operation of saveall systems, particularly those of the vacuum or flotation type. It is further obvious that when such systems are utilized in conjunction with various chemical additives in an attempt to improve their efficiency, that the chemical additives are often not entirely satisfactory. It, therefore, becomes an object of the invention to provide a method for improving the operational efficiency of vacuum and flotation type saveall systems of the type used in treating white waters resulting from the manufacture of paper and similar fibrous substances.

Another object is to provide chemical means which are capable of improving the operational characteristics of several types of saveall systems commonly employed in the treatment of white water in paper manufacturing operations.

An important object of the invention is to provide chemical means for the treatment of saveall systems, which are not greatly affected by pH, type of suspended solids, and other environmental conditions of the white water, and yet which will efficiently improve the recovery of suspended fibrous and other matter in white waters as well as produce a high quality, clear effluent water which may be subsequently re-used in various stages of the paper manufacturing process.

A further object is to provide chemical means for use in conjunction with saveall units in the manufacture of paper which will not interfere with their mechanical functioning.

Still another object is to provide chemical means which will not only improve the general overall efficiency of saveall operations, but which will increase the throughput in a particular system and at the same time increase both the recovery of fines and suspended matter as well as producing a high quality water therein.

A specific object of the invention is to provide a system for processing white water with high molecular weight copolymeric substances which have excellent activity in increasing operational efficiency of saveall units, but yet possess the requisite water solubility to be fed into these systems as solid material or as dilute aqueous solutions and are still thereby immediately available as a dispersed saveall additive.

Other objects will appear hereinafter.

In accordance with the invention it has been found that the operational efficiency of vacuum saveall and flotation type white water recovery systems may be substantially improved by treating the white water with a very small, yet beneficial, amount of a high molecular weight water-soluble copolymer.

These copolymeric additives are products which have been derived by copolymerization of 20–60% by weight of acrylic acid salt monomer and 40–80% by weight of acrylamide monomer. More preferably, the products are synthesized by copolymerization of 25–55% by weight of acrylic acid salt monomer and 45–75% by weight of acrylamide monomer. The above weight percentages are based on total monomer content present at the beginning of the copolymerization reaction. The copolymer products show excellent saveall activity even in additive levels as low as 0.1 p.p.m. based on the weight of the white water influent. The copolymers have usually good water-solubility, notwithstanding the high molecular weights of the products, and may be used as saveall aids in all types of vacuum or flotation type systems.

It has been discovered that acrylic acid salt-acrylamide copolymers having monomer ratios outside the just recited ranges are substantially less efficient than the copolymers of the invention and in many instances show complete inactivity. For a better understanding of this concept, the reader's attention is drawn to the graph of FIG. 1. Here, copolymers of varying acrylic acid salt monomer and acrylamide monomer content were synthesized and tested for their activity as flotation saveall aids.

The following test was run to determine flotation activities of the various copolymers tested. This test simulated actual field conditions. A bleached sulfite, titanium dioxide-filled slurry was beaten to a 50 seconds Williams pulp freeness and formed into a sheet. The effluent containing unsheeted suspended solids was introduced into a pressure apparatus. Chemical additive in the required dosage was also introduced into the apparatus and 40 pounds of air pressure was put over the treated effluent material. The pressure apparatus was shaken and allowed to stand for one minute. The discharge valve of the pressure apparatus was connected to an open tube, the pressure apparatus was opened and the effluent discharged along with air bubbles into the open tube. Solid material floated to the top and the subnatant water from the bottom of the tube was tested for its degree of turbidity after 15 minutes of standing.

Turbidities of subnatant samples were tested by placing these liquids in a Phototester unit which measured the light absorption. The lower the sample turbidity, as measured by percentage of light absorption, the lower the Phototester reading and the greater the degree of separation of floated solids from clarified subnatant liquid. Thus, the smaller the number of Phototester units measured the higher the degree of efficiency of the chemical additive used to aid flotation. A blank was also run in which no chemical flotation aid was added. Turbidity data on the subnatant liquid from the blank run was used as the base point of comparison. The blank sample was also measured for turbidity after the same 5 minute standing period as were subnatant samples from chemically treated pulp effluent.

Curves A, B, C and D were then drawn by plotting of Phototester units versus dosage, expressed in pounds of chemical copolymeric additive per ton of solids in white water influent.

It can be seen that by far the most superior results are obtained by employment of the specific copolymers derived from 30% acrylic acid sodium salt-70% acrylamide and 50% acrylic acid sodium salt-50% acrylamide monomer contents. Such was true at any dosage level. In point of fact, a copolymer comprising 95% acrylic acid sodium salt and 5% acrylamide was completely inactive, and showed no benefit whatsoever over a blank. Likewise, a copolymeric additive containing 5% acrylic acid sodium salt and 95% acrylamide groups was many-fold less active than copolymers falling within the scope of the invention. For example, to achieve a Phototester reading of 40 units, 0.45 pound of the copolymer A (30% acrylic acid sodium salt-70% acrylamide) per ton of white water influent was sufficient. To achieve the same result, 1.3 pounds of copolymer C (5% acrylic acid sodium salt-95% acrylamide) per ton of white water influent was necessary. Copolymer A demonstrated almost a threefold greater degree of efficiency over copolymer C. As a further illustration, to achieve a Phototester reading of 45 units, 0.3 pound per ton of copolymer A had to be added. To achieve the same degree of efficiency, 0.8 pound per ton of copolymer C were added. Again, copolymer A showed nearly a threefold greater degree of activity than copolymer C. Lastly, to achieve a Phototester reading of 50, 0.2 pound of copolymer A were added. To achieve the same degree of efficiency 0.5 pound per ton of copolymer C were added. Again, a typical copolymer of the invention, copolymer A, exhibited a 2½ fold activity increase over copolymer C, which latter compound does not fall within the scope of the invention.

Other copolymeric compositions having varying ratios of acrylic acid salt monomer and acrylamide monomer were also synthesized and tested. In each case, flotation aid activity was substantinally less than those copolymers falling within the range of compounds containing 20–60% acrylic acid salt content and 40–80% acrylamide. Copolymeric compounds increased in saveall activity somewhat as they approached these limits from either the high or low side. It has been discovered, however, that within the aforementioned limits of the invention, marked increase of saveall activity and promotion of flotation were noted.

In order to prepare the copolymers of the invention, it is only necessary to adjust the monomer ratio at the beginning of the polymerization and carry out the copolymerization reaction until products of relatively high molecular weight are achieved. The copolymers of the invention may be produced by conventional methods, and generally have molecular weights in excess of about one million and may range as high as 10 million or so in molecular weight.

Generally, an emulsion-type polymerization is carried out to achieve the relatively high molecular weight ranges. In its broadest aspects, such process may be effected by dissolving acrylamide monomer and acrylic acid in the proper desired proportions, and subsequently neutralizing the acrylic acid present in solution with requisite amounts of a basic substance such as caustic. The acrylic acid salt is then formed in situ. On the other hand, acrylic acid salt may be formed outside the reaction vessel and merely added to the acrylamide monomer in salt form. Preferred acrylate salts include the alkali metal salts of acrylic acid, and the ammonium acrylate salt. The more preferred acrylic acid salt monomers as starting materials are sodium acrylate and ammonium acrylate. Of these, the most preferred is sodium acrylate.

The following examples illustrate preparations of representative copolymers of the invention.

*Example I*

This example illustrates preparation of a copolymer comprised of 30% sodium acrylate monomer and 70% acrylamide.

27 parts by weight of acrylic acid was dissolved in 72 parts by weight of water and cooled to a temperature below 35° C. The above solution temperature was maintained while neutralization with sodium hydroxide was effected. Addition of 30 parts by weight of a 50% solution of sodium hydroxide was necessary to carry out this step. A solution pH of 7–9 was reached after neutralization.

63 parts by weight of acrylamide were then added to the above solution and mixed until dissolved at a solution temperature of 20–30° C. 33 additional parts by weight of water were added and the pH of the monomer solution adjusted to 8.5. 0.8 part of a 1% solution of potassium persulfate were added with stirring to the monomer solution. This was followed by addition of 3.2 parts of a 1% solution of sodium metabisulfite. Into the reaction vessel itself was added 575.0 parts by weight of toluene and 19.6 parts by weight of sorbitan monooleate nonionic emulsifier. To the toluene solution was added the monomer solution containing catalyst and the temperature increased to 75° C. The reaction vessel was purged with nitrogen and an exothermic reaction was then initiated. After the exothermic reaction ceased, the mixture was cooled at 63° C., and additional catalyst added. Specifically, 15.6 parts of a 1.15% solution of azobisisobutyronitrile in toluene were added to the reaction mixture. The nitrogen purge was continued and the temperature held at 63° C., until another exothermic reaction was completed (approximately 30 minutes after initiation). After the second exothermic reaction, water was distilled off by azeotropic distillation, and the solid product isolated by filtration. A 1% solution of the final copolymeric composition had a viscosity of 22,500 cps.

*Example II*

The product copolymer of this example was synthesized by copolymerizing a monomer mixture containing 52% acrylamide and 48% sodium salt of acrylic acid.

A monomer solution was made as follows: 234.72 pounds of soft water was added to 4.8 pounds of acrylic acid. 28.56 pounds of a 50% solution of sodium hydroxide was then added to the acrylic acid solution while maintaining the solution temperature below 95° F., with external cooling water to prevent premature polymerization and crosslinking. When the pH of the solution reached 7–8, 27.0 pounds of acrylamide was added to the monomer solution and dissolved by heating with steam at 86° F. Finally, the pH of the monomer solution was adusted to 8.5 with additional sodium hydroxide solution. 23.52 grams of the catalyst, t-butylhydroperoxide, was added at 86° F., and allowed to mix for 3–5 minutes. The above monomer solution was added to a reaction vessel containing 38.7 pounds of toluene and 3.2 pounds of sorbitan monooleate monionic emulsifier. The reaction mixture was heated to 155° F., and purged with nitrogen. At this point, an exothermic reaction was initiated at approximately a 167° F. reaction temperature. Thirty minutes after the initial exotherm the reaction was considered complete. The reaction mixture was then heated with steam to 190° F. in order to distill off water by an azeotropic technique. The reactor was then cooled, toluene stripped off, and solid copolymer removed. A 1% aqueous solution of the copolymeric product had a viscosity of 23,000 cps.

The copolymers of the invention may contain minor amounts of other groups derived from various water-soluble ethylenically unsaturated monomers containing polar groups. Examples of such monomers are acrylic acid and alkyl esters thereof, vinyl pyrrolidone, vinyl acetate, methacrylamide, vinyl alkyl ethers such as methyl vinyl ether, methacrylic acid and salts and alkyl esters thereof, acrylonitrile, methacrylonitrile, vinyl alcohol, allyl alcohol, allyl amine, etc. By use of the term "water-soluble," it is intended to include not only those substances which are soluble in all proportions with water, but also to include monomers which may have low solubility, but nevertheless may be dispersed or emulsified in water by suitable techniques.

Many important benefits are derived by practice of the process of the invention. First, the copolymer additives increase throughput and the flotation rate. This is, the time required to produce a fibrous mass on the top of the unit, was substantially improved. Another advantage realized through the use of the copolymer composition is that the amount of suspended solids contained in the clarified white water is dramatically diminished. Also, there is a materially improved solids blanket at the top of the saveall unit.

Due to the small dosage of the chemical required to effectively improve the operational characteristics of the saveall, it is not necessary to further treat the suspended solids removed from the system before they are recycled into the paper-making operation. Even in those cases of white waters having a relatively high content of dissolved solids, the copolymer of the invention are still capable of increasing the flotation and removal rate of the suspended solids.

It is believed that the chemicals used in the process of the invention are capable of attaching the fibrous and other suspended matter in the white water to the air bubbles used in the flotation type saveall systems, thereby, substantially increasing their rapid removal from the white water to the surface of the suspension where they may be readily removed in a more compact and uniform form.

An important concept of the invention also resides in the fact that the copolymers used are not substantially affected by either the pH of the system or the particular charge upon the suspended particles contained in the white water systems, thereby permitting their use in a large variety of white water systems.

One of the most startling features of the invention resides in the extremely low dosages at which the copolymers tend to substantially improve saveall operations. This is particularly true in the case of flotation type saveall systems in which the copolymers of the invention have shown their most startling and beneficial results. As a general rule, the white water may be treated with the polymers using as little as 0.01 p.p.m. up to as much as 200 p.p.m., with a general dosage range for most white waters being in the range of from between 0.1 p.p.m. up to 50 p.p.m. 0.2–50.0 p.p.m. will give best results in most instances. The copolymeric chemicals are preferably added to the white water just prior to its being processed either by flotation or vacuum type operation.

It will be understood that the parts per million dosage ranges thus specified are in terms of the entire white water system rather than based upon the solids content of the white water system.

The invention is hereby claimed as follows:

1. A method of improving the operational efficiency of vacuum and flotation type white water recovery systems which contain suspended solids which comprises the step of treating said white water with from 0.1 p.p.m. to 200 p.p.m. of an organic water-soluble anionic copolymer having been derived by copolymerization of 20–60% by weight of acrylic acid salt monomer and 40–80% by weight of acrylamide monomer, said weight percentages being based on total monomer content present at the beginning of the copolymerization reaction, whereby the suspended solids are formed into agglomerated lightweight particles and removing said particles without sedimentation occurring.

2. The method of improving the operational efficiency of flotation type white water recovery systems whereby increased amounts of fibers and solid materials are collected and removed from the white water, which comprises treating the white water with from 0.1 p.p.m. to 200 p.p.m. based on total white water influent of an organic water-soluble anionic copolymer having been derived by copolymerization of 25–55% by weight of acrylic acid salt monomer, and 45–75% by weight of acrylamide monomer, said weight percentages being based on total monomer content present at the beginning of the copolymerization reaction, and removing by flotation means the fibers and solid materials which are in the form of agglomerated lightweight particles.

References Cited
UNITED STATES PATENTS

| | | | |
|---|---|---|---|
| 2,980,609 | 4/1961 | House et al. | 162—190 X |
| 3,023,162 | 2/1962 | Fordyce et al. | 210—54 |
| 3,087,890 | 4/1963 | Pye | 210—54 X |

DONALL H. SYLVESTER, *Primary Examiner.*

HOWARD R. CAINE, *Examiner.*